United States Patent [19]
Grill

[11] Patent Number: 5,700,555
[45] Date of Patent: Dec. 23, 1997

[54] SANDABLE AND STAINABLE PLASTIC/WOOD COMPOSITE

[75] Inventor: Otto Grill, Independence, Ohio

[73] Assignee: Formtech Enterprises, Inc., Stow, Ohio

[21] Appl. No.: 113,989

[22] Filed: Aug. 30, 1993

[51] Int. Cl.$^6$ .............................. B32B 5/06; B32B 17/02; B32B 27/36
[52] U.S. Cl. .................... 428/233; 428/248; 428/265; 428/268; 428/285; 428/286; 428/287; 428/364; 428/365; 428/375; 428/392; 428/393; 428/394
[58] Field of Search .................... 428/233, 248, 428/265, 268, 285, 286, 287, 364, 365, 375, 378, 392, 393, 394

[56] References Cited

U.S. PATENT DOCUMENTS

| | | | |
|---|---|---|---|
| 2,971,861 | 2/1961 | Reese et al. | 117/54 |
| 3,150,032 | 9/1964 | Rubenstein | 161/161 |
| 3,475,261 | 10/1969 | Ettore et al. | 161/43 |
| 3,492,144 | 1/1970 | Sheehan et al. | 117/33 |
| 3,563,844 | 2/1971 | Brown | 161/158 |
| 3,935,047 | 1/1976 | Shinomura | 156/242 |
| 3,954,555 | 5/1976 | Kole et al. | 162/136 |
| 4,053,339 | 10/1977 | Story et al. | 156/62.2 |
| 4,210,692 | 7/1980 | Bohme et al. | 428/106 |
| 4,446,177 | 5/1984 | Munoz et al. | 428/15 |
| 4,505,869 | 3/1985 | Nishibori | 264/115 |
| 4,610,900 | 9/1986 | Nishibori | 428/15 |
| 4,612,224 | 9/1986 | Davis | 428/109 |
| 4,904,523 | 2/1990 | Kampf et al. | 428/288 |
| 5,073,431 | 12/1991 | Martinuzzo | 428/102 |

*Primary Examiner*—Thurman K. Page
*Assistant Examiner*—Kathryne E. Shelborne
*Attorney, Agent, or Firm*—Oldham & Oldham Co., LPA

[57] ABSTRACT

A composite article includes a first zone made entirely of plastic and a second zone made of plastic and natural fiber. The first and second zones are integral and are continuously coextruded. The ratio of natural fiber in the second zone is between 10% and 55%. The outer surface of the second zone includes embossing to resemble wood grain. The outer surface has sufficient porosity so as to hold and retain wood stain and paint so that the composite article is stainable to resemble genuine wood. The composition of the second zone includes between 45% and 90% polyvinylchloride, between 10% and 55% natural fiber, and external lubricate and a fusion enhancer. A color adjusting agent such as titanium dioxide, and coloring agents may also be added.

16 Claims, 2 Drawing Sheets

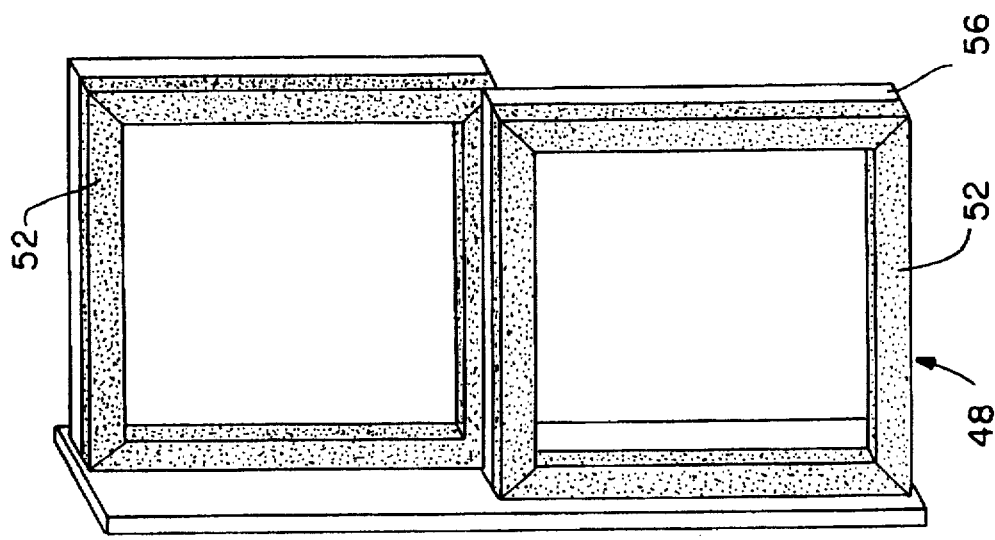
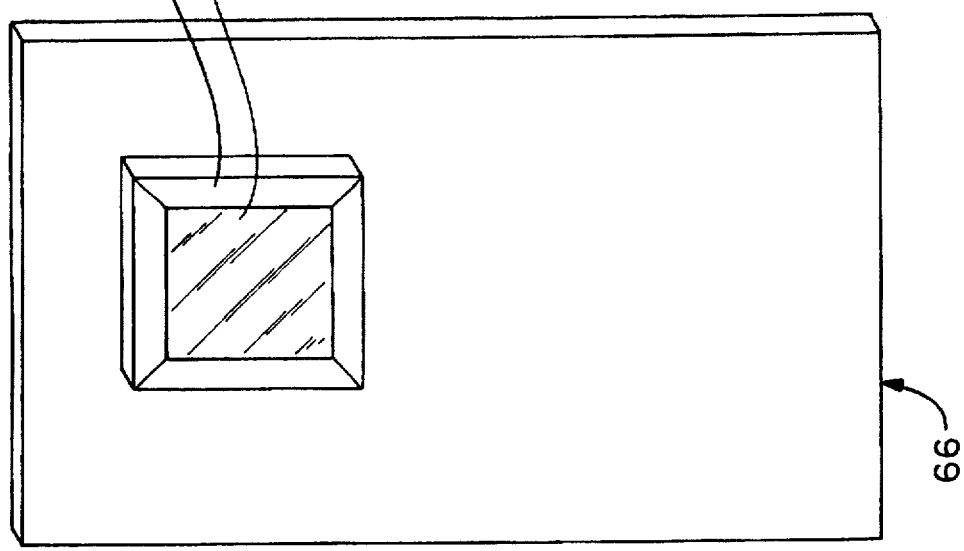
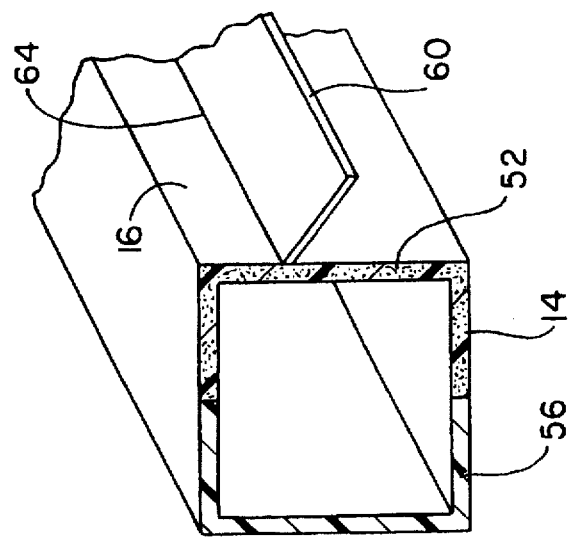

SANDABLE AND STAINABLE PLASTIC/WOOD COMPOSITE

BACKGROUND OF THE INVENTION

1. Field of Invention

This invention relates to the art of composites comprising of plastic and a mixture of plastic and natural fibers and methods for producing the same, and more particularly to window and door components made of the same composite.

2. Description of Related Art

It is known in the art to combine different forms of plastic with different forms of natural fiber such as woodflour, crushed shells of nuts, and other natural materials. The purpose for such previous combinations has been to enhance the physical properties and lower the cost of the product.

In the art of window and door components and trim, such components have historically been made of 100 % natural wood. In recent years, components of windows and doors have been made of plastic for certain performance and cost advantages. In such cases, the plastic is often colored with a coloring agent to give a wood-like appearance or to match the colors of the surrounding area. Although the colored plastic may appear somewhat wood-like, it can not be painted or sanded or stained like real wood. For this reason, it was difficult, if not impossible, to match plastic components to natural wood surroundings. Another product is to wrap the plastic with a foil or laminate having a wood-like appearance. Such foil laminates are expensive and easily damaged.

The present invention contemplates a new and improved article and method of making the article which is effective in use and overcomes the foregoing difficulties and disadvantages while providing better and more advantageous overall results.

SUMMARY OF THE INVENTION

In accordance with the present invention, a new and improved article of manufacture and method of making the same is provided.

More particularly, in accordance with the invention, the composite article includes first and second zones. The first zone is comprised of plastic and the second zone is comprised of plastic and natural fiber. The first and second zones being integral, being coextruded together. The ratio of natural fiber to plastic in the second zone is between 10% to 55%.

In accordance with another aspect of the invention; the second zone is outward of the first zone and includes an outer surface. The outer surface has sufficient porosity so as to hold and retain wood stain so that the article is stainable. The outer surface is also sandable and can be embossed to resemble wood gain.

According to another aspect of the invention, a weather stripping member can be affixed to the outer surface of the second zone by a continuous coextrusion process.

According to another aspect of the invention, the article is a column with a generally square cross-section. A center plane divides the first zone from the second zone, with the second zone to be positioned as the interior side of an associated window.

According to another aspect of the invention, the article includes color adjusting means for adjusting discolorations in the natural fiber and coloring means for coloring the article to resemble the wood to be emulated. In one embodiment, the adjusting means is titanium dioxide.

According to a further aspect of the invention, a method of manufacturing a composite article including a first zone of plastic and a second zone of plastic and natural fiber includes the steps of simultaneously extruding a first extrudate from a first extruder and a second extrudate from a second extruder through a dual extrusion head, thereby forming an integral composite of the first and second extrudate. It is important to extract the moisture in the wood (approximately 5% to 6%), this is done by pulling a vacuum of at least 0.5 bar in the vent section of the composite extruder. Next, the composite is passed through a vacuum calibration system to form the article with the means of a puller. Next, the article is cut to a desired length with a cutter. A coloring agent and a color adjusting agent can be added to the process. Other steps may include mixing a ratio of between 10% and 55% natural fiber and between 90% and 45% polyvinylchloride in a ribbon blender until homogenous. The mixing of the ratio of natural fiber and polyvinylchloride can also be blended at the throat of the second extruder.

One advantage of the present invention is the provision of an article which can better withstand temperature variation. Because natural fibers such as woodflour and other materials containing cellulose have better dimensional stability in cases of temperature variation than does plastic, the article tends to retain dimensional stability of a wider range of temperatures.

Another advantage of the invention is the provision that the material may be inexpensively made of plastic and yet can have an outer surface which can be sanded, stained, or painted as if made of solid wood.

A still further advantage of the invention is the provision that the material can be colored to more closely resemble surrounding natural wood, and can be further sanded or stained or painted to more fully resemble the surrounding natural wood.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 3 is perspective view of a double hung window utilizing components manufactured according to the invention;

FIG. 4 is a steel, fiberglass or wood door utilizing components manufactured according to the invention;

FIG. 5 is a window component manufactured according to the invention; and,

DESCRIPTION OF THE REFERRED EMBODIMENT

Figure 1:
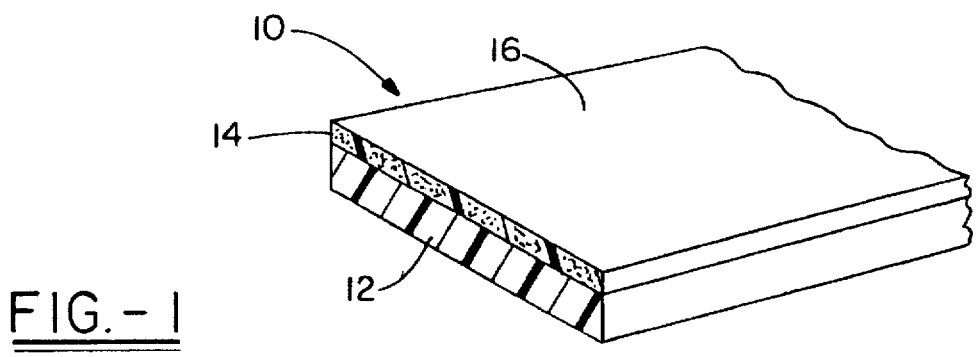
FIG. 1 is a perspective view of a piece of trim manufactured according to the invention.

Referring now to the drawings wherein the showings are for purposes of illustrating a preferred embodiment of the invention only and not for purposes of limiting the same, FIGS. 1–5 show various composite articles of manufacture according to the invention. More specifically, with reference to FIG. 1, the composite article 10 has a first zone 12 and a second zone 14. The second zone 14 has an outer surface 16. In a preferred embodiment, the first zone 12 is made entirely of plastic.

The preferred plastic is polyvinylchloride, or PVC. The second zone 14 is a composite made of natural fiber and plastic. The preferred plastic is polyvinylchloride. The preferred natural fiber is woodflour, although other natural fibers containing naturally occurring cellulose such as crushed shells of nuts can be successfully used.

The ratio of natural fiber to plastic in the second zone 14 is preferably between 10% and 55% natural fiber compared with 90% to 45% plastic.

The outer surface 16 of the second zone 14 is formed so that it has sufficient porosity so as to hold and retain conventional wood stain. The porosity of the outer surface 16 is controlled by adding a small additional amount of metal release agent. Increasing the amount of the metal release agent decreases the porosity of the outer surface 16 and decreasing the amount of the release agent increases the amount of porosity. The preferred metal release agent is available under commercial name RHEOCHEM RHEOLUBE, a paraffin and/or hydrocarbon wax blend [CAS Reg. No. 8002-74-2] having a melting point above 170° F., RHEOCHEM RHEOLUBE The outer surface 16 is also sandable as with conventional sandpaper. The outer surface 16 can also be painted. As such, the outer surface 16 of the second zone 14 can be sanded, painted or stained to closely resemble genuine wood work and can be matched to other work in the room application.

In order to more accurately emulate the surrounding wood work, a commercially available coloring agent can be added to the plastic to more closely resemble the color of wood to be emulated. In the second zone 14, variations and color of natural fiber may make such color emulation difficult to accomplish. It has been learned that better color uniformity can be obtained by applying a color adjusting agent, such as titanium dioxide, to the natural fiber polyvinylchloride composite along with the coloring agent. The color adjusting agent smooths out color variations in the natural fiber and allows them to be more uniformly tinted by the coloring agent.

The composite which makes up the second zone 14 includes natural fiber and a ratio of between 10%.and 55%, polyvinylchloride at a ratio of between 90% and 45%, and an external lubricant to obtain a surface suitable for staining. A preferred lubricant is available under the trade name Rheochem Rheolube. In addition, a small amount of a fusion enhancer is required to promote fusion in the extruder prior to venting to allow application of a vacuum to abstract moisture from the natural fiber.

Figure 6:
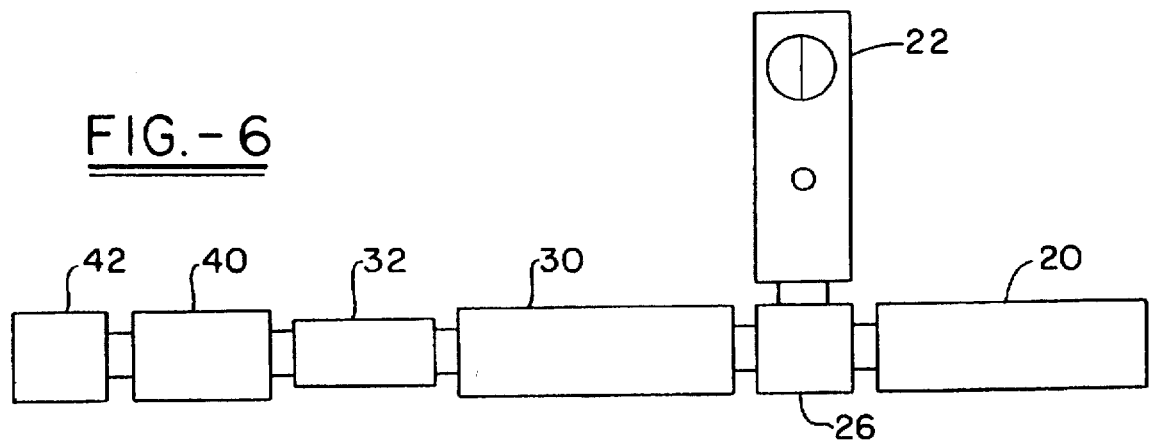
FIG. 6 is a schematic diagram of equipment utilized to manufacture the invention.

With reference to FIG. 6, a typical manufacturing operation is schematically shown. A first extruder 20 extrudes plastic through a dual extrusion head 26. A second extruder 22 excludes the natural fiber/plastic composite through the dual extrusion head 6. The preferred manufacturing operation utilizes a conical twin extruder because it has good polyvinylchloride processing characteristics and can homogenize the polyvinyl chloride and woodflour. Single extruders can be successfully used although the throughput rates will be considerably less. From the dual extrusion head 26 exits an integral composite article 10 in which the first zone and second zone are integrally connected. The composite article 10 is next passed through a vacuum calibration device 30 in order to form the extrudate. According to a currently preferred embodiment, the article is embossed through an embossing device 32 with reference to FIG. 2, common designs which are embossed onto the outer surface 16 of composite articles 10 include wood grain 36. With reference to FIG. 6, a puller 40 continues to pull the composite article 10 through the manufacturing device. Finally, a cutter 42 cuts the composite articles 10 to the desired length.

A typical polyvinylchloride formulation that can be mixed with woodflour using commercially available products follows:

100 lbs of Georgia Gulf 3304 WHT 194 (typical indoor powder configuration of polyvinylchloride)
2.155 lbs of Rheochem Rheolube 185
0.259 lbs of Allied Signal AC316, (fusion enhancer, oxidized polyethylene)
1.293 ibs of Ferro V-9156 Pigment
4.310 lbs of DuPont R960 (titanium dioxide)

The above ingredients can be added by the manufacturer of the polyvinylchloride (in this case, Georgia Gulf) when the plastic is manufactured. In the alternative, the ingredients can be added later in a high intensity mixer. This compound is then mixed in a Ribbon blender with the natural fiber and mixed or metered at the extruder throat. The preferred natural fiber, woodflour, is manufactured in hardwood and pine grades, or in any natural fiber containing cellulose, and in various particle size distributions. While mesh sizes from 20 mesh (850 microns) to 140 mesh (106 microns) are acceptable, the preferred wood fiber is available from American Wood Fibers and is 80 mesh (180 micron) hardwood grade.

Figure 2:
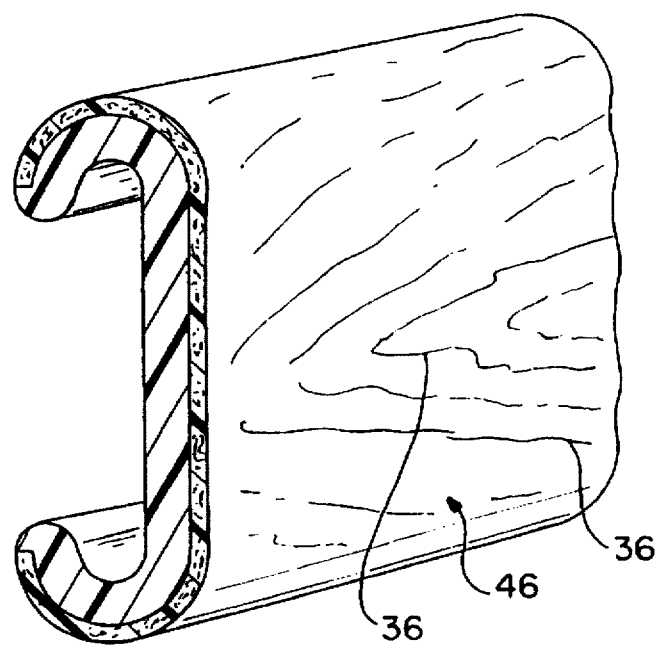
FIG. 2 is a perspective view of another component, in this case a handle rail, manufactured according to the invention.

With reference to FIG. 2, a handle rail 46 such as might be manufactured in this process is shown.

With reference to FIG. 3, typical double hung windows 48 are shown. Certain components of double hung windows 48 can be advantageously manufactured through the inventive process disclosed herein. Due to temperature variations in windows, with very cold weather on one side of the window being juxtaposed against warm temperatures on the interior side of the window, dimensional integrity of plastic window components can be a problem. Since natural fibers have better thermal stability than some plastics, the addition of natural fiber can improve performance. Heretofore, plastic components would necessarily be visible from the interior side of the window. These interior components could only roughly approximate the appearance of natural wood. Some previous attempts to rectify this problem included wrapping such components with foil which simulated wood grain. As discussed previously, this technique was expensive and the foil was often too fragile to retain its appearance for long periods of time under heavy use. With reference again to FIG. 3, the interior half 52 of a typical double hung window 48 is shown schematically as including the natural fiber/polyvinylchloride composite. With reference to FIGS. 3 and 5, it can be seen that the interior half 52 of the component includes the natural fiber/natural composite while the exterior 56 is made entirely of polyvinylchloride.

With continuing reference to FIG. 5, according to one embodiment of the invention, weather stripping 60 is integrally affixed to the outer surface 16 of the second zone 14 along a longitudinal edge 64.

With reference to FIG. 4, another common application of the invention is shown. In FIG. 4, a door 66 is primarily made of metal, fiberglass or wood. Some designs feature window glass 68 surrounded by trim 70. The trim 70 is also a good application of the composite article 10 of the invention.

The invention has been described with reference to a preferred embodiment. Obviously, modifications and alterations will occur to others upon a reading and understanding of this specification. It is intended to include all such modifications and alterations insofar as they come within the scope of the appended claims or the equivalence thereof.

Having thus described the invention, it is now claimed:

1. A composite article of manufacture comprising:

a first zone, said first zone being comprised of a first plastic; and a second zone, said second zone being comprised of
   a second plastic, and
   a natural cellulose-containing fiber,
   a paraffin or hydrocarbon wax blend metal release agent to control the porosity of said second zone having an outer surface, said outer surface being porous to hold and retain wood stain or paint; and
   an oxidized polyethylene fusion enhancer to form a homogeneous melt of the natural cellulose-containing fiber and the second plastic and modifies the effect of the porosity aid which deters fusion, yet retains the porosity of the second zone; and said first and second zones being integral and being coextruded together.

2. The article of claim 1 wherein a ratio of natural fiber to plastic in said second zone is between 10% and 55%.

3. The article of claim 1 wherein said natural fiber is woodflour having a particle size between 850 microns and 106 microns.

4. The article of claim 1 wherein said second zone further comprises:

an outer surface, said outer surface having porosity so as to be sandable.

5. The article of claim 1 wherein said article further comprises:

a weather stripping member, said weather stripping member being affixed to said second zone.

6. The article of claim 1 wherein said article is a column with a generally square cross-section, said article having a center plane, said center plane dividing said first zone from said second zone, said second zone to be mounted on an interior side of an associated window.

7. The article of claim 1, said article further comprising a coloring means for coloring said article.

8. The article of claim 7 wherein said article further comprises a color adjusting means for adjusting the color of said article.

9. The article of claim 8 wherein said color adjusting means comprises titanium dioxide.

10. The article of claim 1 wherein second zone further comprises:

an said outer surface has embossing thereon.

11. The article of claim 1 wherein said second zone comprises: polyvinylchloride in a ratio of between 45% and 90% ; and natural fiber in a ratio of between 10% and 55%.

12. The article of claim 11 wherein said natural fiber has a particle size between 850 microns and 106 microns.

13. The article of claim 11 wherein said natural fiber is hardwood woodflour.

14. A composite article formed by a coextrusion process, said composite article characterized by:

a first zone, said first zone being formed from a first extrudate, said first extrudate comprising polyvinylchloride;

a second zone, said second zone being formed from a second extrudate, said second extrudate comprising polyvinylchloride,
    a natural cellulose-containing fiber,
    a paraffin or hydrocarbon wax blend metal release agent to control the porosity of said second zone, a surface of the second extrudate having a porosity sufficient to hold and retain wood stain or paint, and
    an oxidized polyethylene fusion enhancer to form a homogeneous melt of the natural cellulose-containing fiber and the polyvinylchloride and modifies the effect of the metal release agent which deters fusion, yet retains the porosity of said second zone; and said first and second zones being integrally connected.

15. The article of claim 14 wherein said second extrudate further comprises:

a coloring agent; and a color adjusting agent.

16. The article of claim 14 wherein said second extrudate comprises said polyvinylchloride in a ratio of between 50% and 95%, and said natural fiber in a ratio of between 10% and 50%.

* * * * *